United States Patent
Kim et al.

(10) Patent No.: US 10,516,573 B2
(45) Date of Patent: Dec. 24, 2019

(54) AUTOMATIC CONFIGURATION TOOL FOR CONFIGURING AND INSTALLING DISTRIBUTED ANTENNA SYSTEM AND INSTALLATION GUIDE USING THE SAME

(71) Applicants: KMW U.S.A., Inc., Fullerton, CA (US); SK Telesys Co., Ltd., Seongnam-Si (KR)

(72) Inventors: Bung Chul Kim, Glendale, CA (US); O Su Shin, Yorba Linda, CA (US); Nak Zu E, Fullerton, CA (US); Bo Yong Bae, Irvine, CA (US); Daniel Taeyoon Kim, Cypress, CA (US); Joon Hyong Shim, Yongin-si (KR); Dae Ho Woo, Incheon (KR); Dae Kwang Kim, Yongin-si (KR); Ki Wook Kim, Seoul (KR); Soo Young Choi, Seoul (KR); Myoung Yong Shin, Seongnam-si (KR); Young Ho Jeon, Seongnam-si (KR)

(73) Assignees: KMW U.S.A., Inc., Fullerton, CA (US); SK Telesys Co., Ltd., Seongnam-Si (KR)

( * ) Notice: Subject to any disclaimer, the term of this patent is extended or adjusted under 35 U.S.C. 154(b) by 563 days.

(21) Appl. No.: 15/198,619

(22) Filed: Jun. 30, 2016

(65) Prior Publication Data
US 2017/0250860 A1    Aug. 31, 2017

(30) Foreign Application Priority Data
Feb. 29, 2016    (KR) ........................ 10-2016-0024055

(51) Int. Cl.
*H04L 12/24*    (2006.01)
*H04W 24/02*    (2009.01)
*H04W 88/08*    (2009.01)

(52) U.S. Cl.
CPC ......... *H04L 41/0843* (2013.01); *H04W 24/02* (2013.01); *H04W 88/085* (2013.01)

(58) Field of Classification Search
CPC .. H04L 41/0843; H04W 24/02; H04W 88/085
See application file for complete search history.

(56) References Cited

U.S. PATENT DOCUMENTS

| 2002/0000931 | A1* | 1/2002 | Petronic ................. H01Q 1/125 342/359 |
| 2003/0148747 | A1* | 8/2003 | Yamamoto ........... H03G 1/0023 455/234.1 |

(Continued)

FOREIGN PATENT DOCUMENTS

| KR | 2005-0057822 A | 6/2005 |
| KR | 2005-0102087 A | 10/2005 |

(Continued)

OTHER PUBLICATIONS

Korean Office Action (in Korean) dated Mar. 16, 2017 regarding corresponding application in Korea (6 pages).

*Primary Examiner* — Gil H. Lee
*Assistant Examiner* — Javier O Guzman
(74) *Attorney, Agent, or Firm* — Harness, Dickey & Pierce, P.L.C.

(57) ABSTRACT

The present disclosure in some embodiments relates to an automatic configuration tool to configure and install a distributed antenna system and an installation guide using the same. According to an aspect of the present disclosure, a user or a designer is graphically provided with a user interface to define a shape of the distributed antenna system, and is provided with a configuration tool for generating a configuration file for a configuration of an actual distributed antenna system. According to another aspect of the present disclosure, there is suggested a distributed antenna system (Continued)

for providing an installation guide function by using a configuration file generated in the configuration tool.

7 Claims, 9 Drawing Sheets

(56) References Cited

U.S. PATENT DOCUMENTS

| | | | | |
|---|---|---|---|---|
| 2003/0229861 | A1* | 12/2003 | Quigley | G06F 17/50 716/102 |
| 2004/0143428 | A1* | 7/2004 | Rappaport | G06F 17/509 703/22 |
| 2004/0198235 | A1* | 10/2004 | Sano | H04B 7/00 455/69 |
| 2005/0107034 | A1* | 5/2005 | Lee | H04B 7/15535 455/11.1 |
| 2008/0058018 | A1* | 3/2008 | Scheinert | H04B 7/15528 455/562.1 |
| 2010/0194475 | A1* | 8/2010 | Okayama | H04B 1/18 330/151 |
| 2012/0134673 | A1* | 5/2012 | Palanisamy | H04B 10/25754 398/58 |
| 2012/0270507 | A1* | 10/2012 | Qin | H04W 88/085 455/73 |
| 2013/0163648 | A1* | 6/2013 | Kennard | H04L 27/2626 375/219 |
| 2013/0250872 | A1* | 9/2013 | Aoki | H04W 72/0406 370/329 |
| 2015/0019979 | A1* | 1/2015 | Alden | H04W 24/02 715/736 |
| 2015/0332357 | A1* | 11/2015 | McBride | G06Q 30/0601 705/26.1 |
| 2016/0098167 | A1* | 4/2016 | Shah | G06F 3/0488 345/173 |
| 2016/0100321 | A1* | 4/2016 | Arai | H04W 24/02 455/67.14 |

FOREIGN PATENT DOCUMENTS

| | | | | |
|---|---|---|---|---|
| KR | 2008-0111789 A | | 12/2008 | |
| WO | WO-2012037403 A1 | * | 3/2012 | H01Q 1/00 |
| WO | WO-2015145423 A1 | * | 10/2015 | H04B 17/12 |

* cited by examiner

AUTOMATIC CONFIGURATION TOOL FOR CONFIGURING AND INSTALLING DISTRIBUTED ANTENNA SYSTEM AND INSTALLATION GUIDE USING THE SAME

CROSS-REFERENCE TO RELATED APPLICATIONS

The present application is based on, and claims priority from, Korean Patent Application Number 10-2016-0024055, filed Feb. 29, 2016, the disclosure of which is incorporated by reference herein in its entirety.

TECHNICAL FIELD

The present disclosure in some embodiments relates to a distributed antenna system.

BACKGROUND

The statements in this section merely provide background information related to the present disclosure and do not necessarily constitute prior art.

Distributed antenna system (DAS) is used to meet the increasing demand for an improved quality of mobile communication services and to get rid of shadow areas. In order to support various frequencies of various businesses or operators, the distributed antenna system is designed to be open to all possible configuration combinations.

FIG. 6 is a schematic block diagram illustrating a configuration of an exemplary distributed antenna system. FIG. 6 presents a functional configuration of the distributed antenna system, wherein modules interconnected by an RF cable is labeled "RF" in their connection line, and labeled "Optic" where there are interconnected by an optical fiber. Although the RF cable between modules is illustrated as a single line, it may be composed of two lines representing a pair of cables for an uplink and a downlink. The DAS illustrated in FIG. 6 is of a configuration that simply supports only a multiple-input multiple-output (MIMO), which may give a hardship for a user or an installer to configure and install the DAS with increased number of modules or units to be installed. Further, in case of a DAS system having a sectorization function, the jobs become more difficult without an aid to the installation. The sectorization is a technique for dynamically changing the geographic area covered by a group of remote units. In place of an exemplary configuration and a detailed description to support the above, incorporated herein in its entirety is Korean Patent Application No. 10-2015-0154807, filed by the same Applicant herein by reference.

FIG. 7 presents an exemplary view of an actual shape of a headend unit of a distributed antenna system. The dotted line represents a downlink, and the double dotted line represents an uplink. Configuration and installation of the distributed antenna system of FIG. 7 mean to set up a service environment that can provide a designed service of the optimal condition through (i) properly mounting the component modules in position, (ii) connecting RF cable between the modules, (iii) controlling a gain of each front-end module depending on an intensity of each of base station RF signals received through a BDA (bi-directional amplifier) or an eNodeB, and (iv) properly compensating for a line loss for each optical fiber cable. Therefore, an installer needs to have a complete understanding of the overall configuration of such design plan as shown in FIG. 6, and function, type and connection of each of the modules to be able to appropriately carry out a series of processes related to the configuration and installation of the distribution system.

SUMMARY

Some embodiments of the present disclosure provide a method, performed by a computer, for generating a configuration file for configuring a distributed antenna system, including
   providing a graphical user interface for defining types and attributes of modules that configure the distributed antenna system, and
   collecting at least one user input imported through the graphical user interface and generating the configuration file in a format that is executable by a processor of the distributed antenna system.

Some embodiments of the method for generating the configuration file may further include at least one of features as follows:

The user input includes settings of the types, number and installation locations of the modules that configure the distributed antenna system, of cable connections between the modules, of an intensity of a signal input into the distributed antenna system from each base station, and of an intensity ratio of a plurality of base station signals using adjacent frequency bands.

The method further includes
   analyzing reference files generated by a propagation environment design tool, the reference files including a file indicating a list of modules configuring a model used in the propagation environment design tool and a file indicating connections between modules, and
   presenting an arrangement of the modules configuring the distributed antenna system and cable connections between respective modules, through the graphical user interface, based on a result of the analyzing of the reference files.

The graphical user interface provides a function for enabling a user to arbitrarily add or delete modules. The graphical user interface also provides a function for automatically suggesting cable connections between the modules after the defining of the types and the attributes.

The method further includes loading a predefined configuration file, and modifying the predefined configuration file based on a user input.

The configuration file can be prepared in an XML (eXtensible Markup Language) format or in a variable language format.

Another embodiment of the present disclosure provides a method, performed by a headend unit of a distributed antenna system, for providing an installation guide, including
   receiving a configuration file generated from a design model of the distributed antenna system, the configuration file including information on types and attributes of objects included in the design model,
   providing a graphical user interface for guiding types and locations of modules to be installed in the headend unit, correspondingly to defined types and locations of objects defined in the configuration file, and
   providing a graphical user interface for guiding cable connections between the modules installed in the headend unit, correspondingly to defined cable connections between the objects defined in the configuration file.

Some embodiments of the method for providing an installation guide may further include at least one of features as follows:
   The method further includes determining whether the modules installed in the headend unit match defined information in the configuration file, and providing, in response to a determination of a mismatch between the modules and the defined information, information on a mismatched module.

The method further includes determining whether the defined cable connections between the objects in the configuration file match the cable connections between the modules installed in the headend unit, and providing, in response to a determination of a mismatch between the defined cable connections and the cable connections, information on a mismatched module connection.

The method further includes controlling at least one LED (light emitting diode) provided in the modules to be interconnected by using a cable, so as to enable a user to visually recognize the modules to be interconnected.

The method further includes controlling gains of the modules installed in the headend unit, depending on intensities of signals inputted from base stations defined in the configuration file.

The method further includes controlling a ratio of signal intensities of base station signals using adjacent frequency bands, depending on a defined ratio of signal intensities between base station signals defined in the configuration file.

The method further includes receiving, from a user, signal intensities inputted from base stations; and controlling gains of the modules installed in the headend unit, based on inputted signal intensities.

The method further includes receiving, from a user, an inputted ratio of signal intensities of base station signals using adjacent frequency bands, and controlling intensities of the base station signals using the adjacent frequency bands, based on the inputted ratio of the signal intensities.

Yet another embodiment of the present disclosure provides a headend unit of a distributed antenna system, including a configuration file input unit, an installation management unit and a cable connection management unit. The configuration file input unit is configured to receive a configuration file generated from a design model of the distributed antenna system, the configuration file including information on objects included in the design model and attributes of the objects. The installation management unit is configured to provide a graphical user interface for guiding types and locations of modules to be installed in the headend unit, correspondingly to defined types and locations of the objects defined in the configuration file. And the cable connection management unit is configured to provide a graphical user interface for guiding cable connections between the modules installed in the headend unit, correspondingly to defined cable connections between the objects defined in the configuration file.

DETAILED DESCRIPTION

Figure 1:
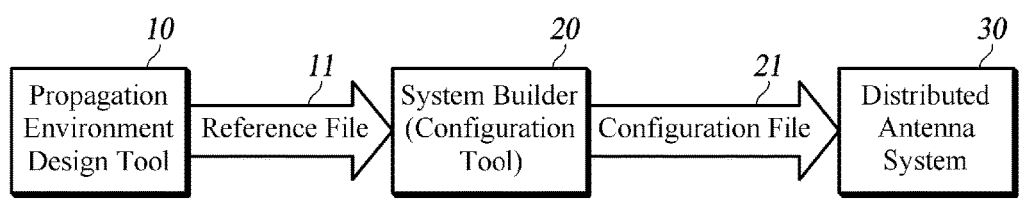
FIG. 1 is a schematic diagram of a method for configuring a distributed antenna system according to an embodiment of the present disclosure.

Exemplary embodiments of the present disclosure are described below with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Various terms such as first, second, A, B, (i), (ii), (a), (b), etc., are used solely for the purpose of differentiating one component from the other, but not to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof.

Some embodiments of the present disclosure provide a distributed antenna system which is capable of providing an installation guide function. Further, embodiments of the present disclosure provide a configuration tool which generates a configuration file which the distributed antenna system uses to provide the installation guide function.

FIG. 1 is a schematic diagram of a method for configuring a distributed antenna system according to an embodiment of the present disclosure.

Referring to FIG. 1, a configuration method of the distributed antenna system, DAS is implemented by using a propagation environment design tool 10, a configuration tool 20 to generate a configuration file for DAS configuration, and a distributed antenna system 30.

The propagation environment design tool 10 is a software that predicts a propagation environment when installing the DAS by emulating an intensity of service signals outputted from an antenna which is connected to a remote unit based on such factors as the relevant building's environmental condition, wall material, thickness, ceiling height and structure. The propagation environment design tool 10 may be included as a module of an in-building wireless network design tool. The in-building wireless network design tool is a software that automates an in-building wireless network designing process to build an in-building wireless communication environment, which supports network planning, designing, cost validation and documentation. Its typical example is "iBwave Design™" provided by IBwave Solutions Inc., Montreal, CANADA.

The propagation environment design tool 10 outputs a reference file 11. The reference file 11 to export may include an Excel spreadsheet format file (for example, EquipmentListReport.xls which is referred to as "module list file", hereinafter) indicating a list of modules or units used to make a design, and an excel spreadsheet format file (for example, CableRoutingReport.xls which is referred to as "cable routing report file", hereinafter) indicating cable connections between modules. The design level of the DAS that the propagation environment design tool 10 handles has a conceptual configuration as exemplified in FIG. 6.

Figure 6:
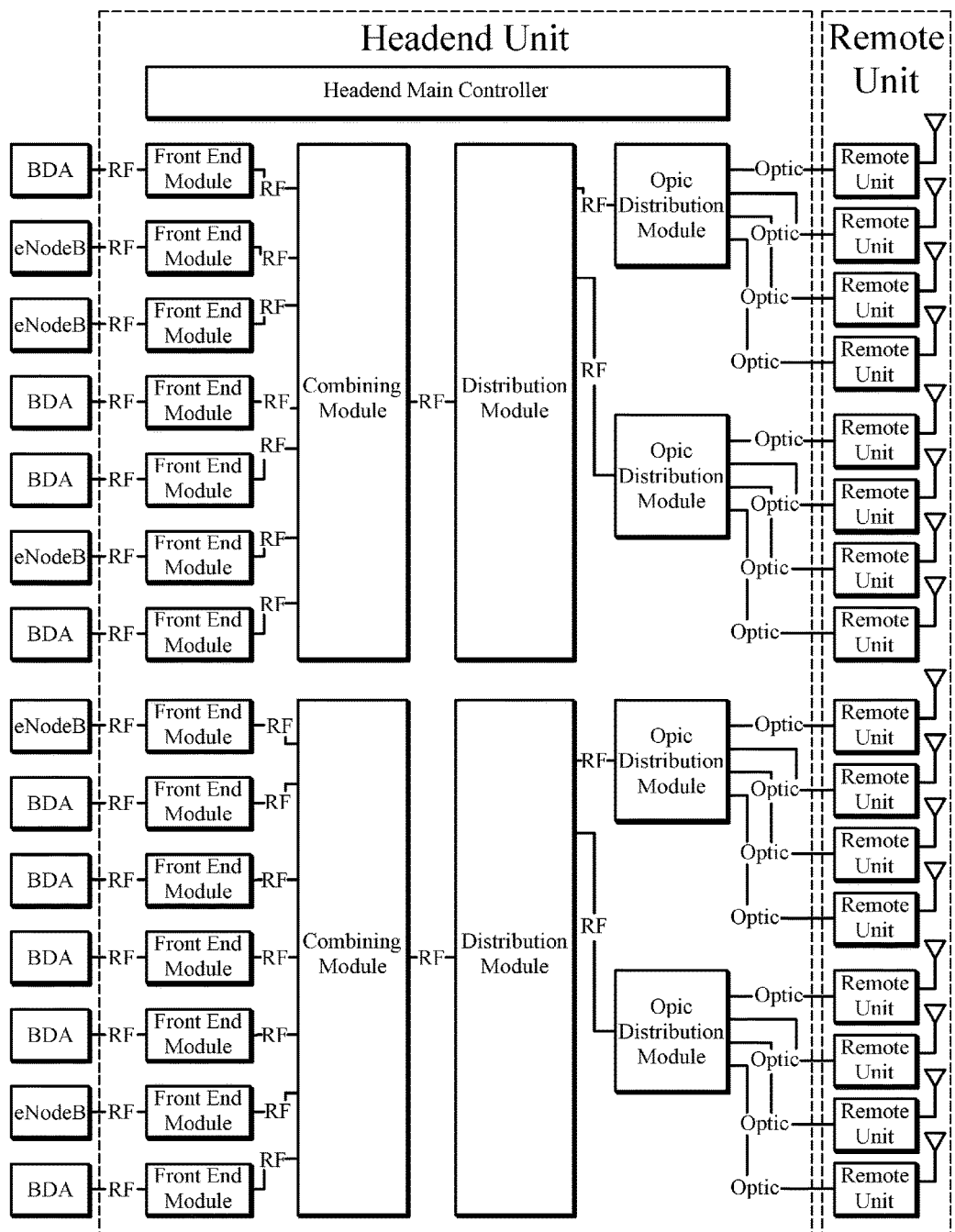
FIG. 6 is a schematic block diagram illustrating a configuration of an exemplary distributed antenna system.
Figure 7:
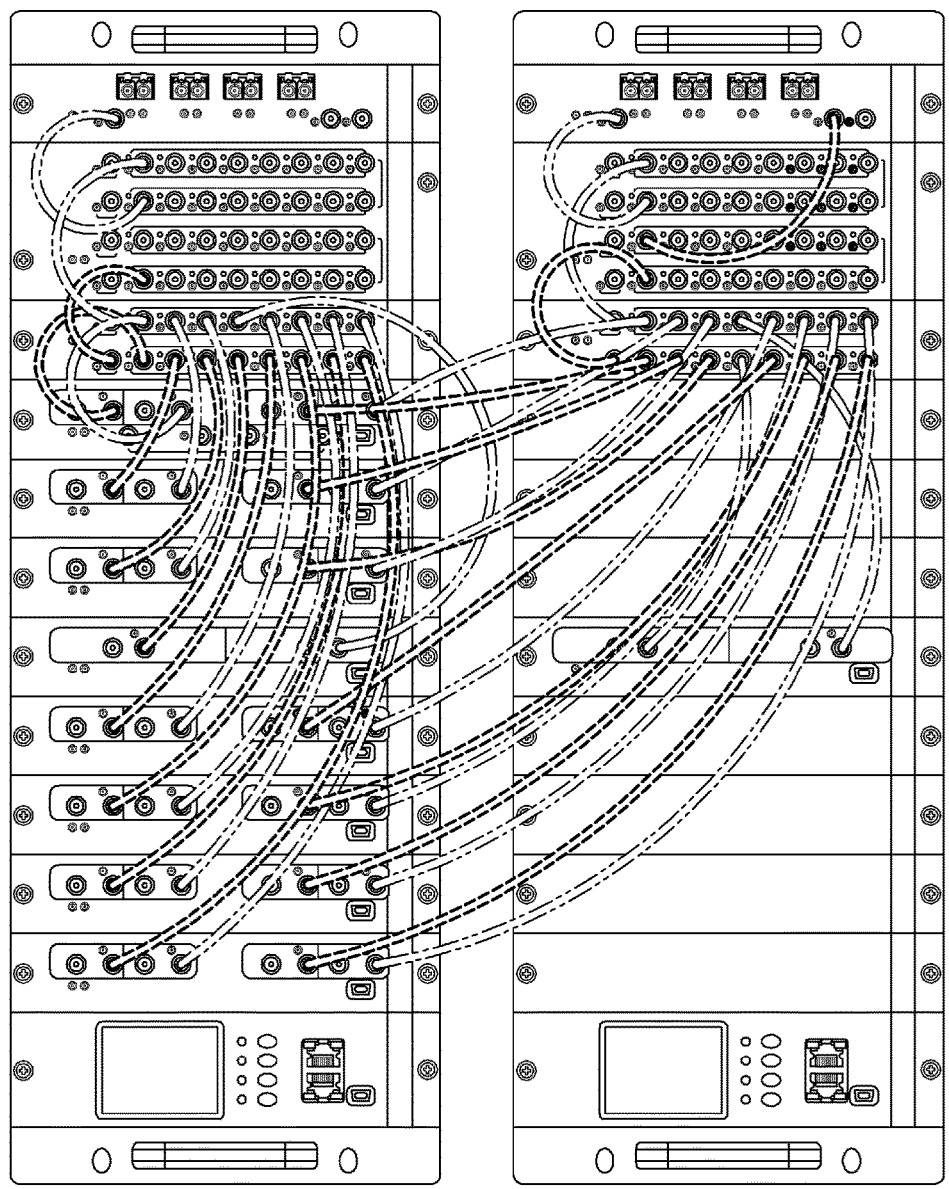
FIG. 7 is an exemplary view of an actual shape of a headend unit of a distributed antenna system.

The configuration tool 20 is a software that converts the conceptual configuration of FIG. 6 into an actual product configuration of FIG. 7. The configuration tool 20 generates a routing diagram indicating the arrangements and connections of respective modules by using the reference file 11 generated by the propagation environment design tool, and generates the configuration file 21 based on changes or additional information inputted from the user. Here, the configuration file 21 refers to a digital file of an XML (Extensible Markup Language) format or other formats interpretable by the distributed antenna system. The configuration file 21 defines types and attributes of the modules that constitute a model of the distributed antenna system. Here, the attributes of the modules include, for example, a module location, a cable connection between the modules, a sector in which each module provides services, an intensity of an RF signal inputted from each base station, and a power ratio of input signals of multiple base stations that use the adjacent frequency bands.

The configuration tool 20 may be implemented by an independent computing unit or a main controller of a headend unit of the distributed antenna system 30.

The distributed antenna system 30 receives the configuration file 21 generated by the configuration tool 20 to provide installation guide functions to the type and location of each module and a cable connection between modules as suggested by the installation file 21. The distributed antenna system 30 also performs a configuration work to automatically control gains of the installed modules. That is, the headend unit of the distributed antenna system 30 provides a user with an installation guide for an installation, a connection and a verification of each module, and a system optimization.

Figure 2:
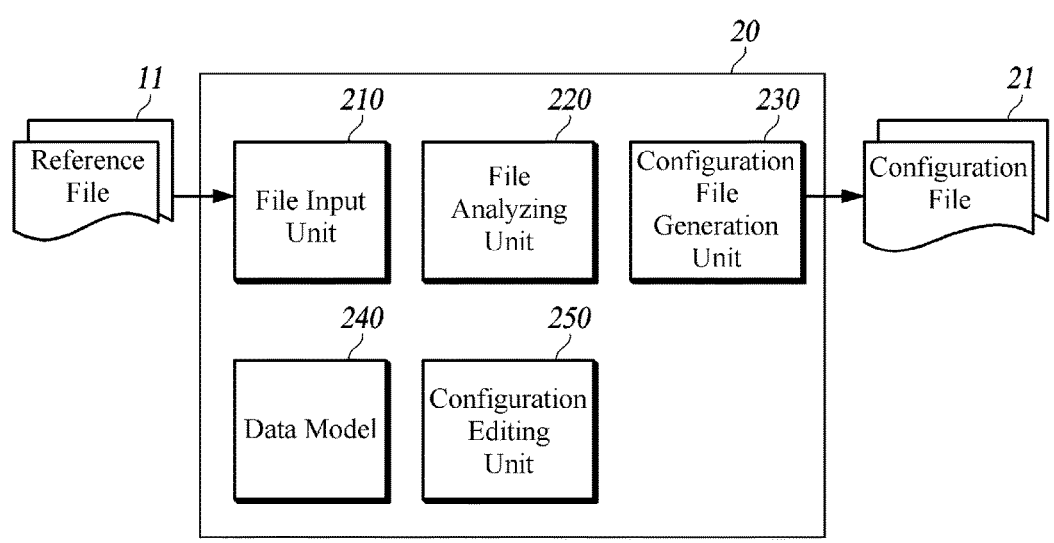
FIG. 2 is a diagram of main functional elements of a configuration tool according to an embodiment of the present disclosure.

FIG. 2 is a diagram of main functional elements of a configuration tool according to some embodiments of the present disclosure.

As illustrated in FIG. 2, the primary functional elements of the configuration tool 20 includes a file input unit 210, a file analyzing unit 220, a configuration editing unit 250 and a configuration file generation unit 230.

The file input unit 210 receives a reference file 11 generated from the propagation environment design tool, when the file analyzing unit 220 defines an arrangement and a connection of each module by the generated file.

The configuration editing unit 250 provides a graphical user interface for defining the types and attributes of modules configuring the distributed antenna system.

The graphical user interface may display a basic interconnection diagram that indicates the arrangement and connections of the respective modules. The configuration editing unit 250 may generate an interconnection diagram based on contents analyzed by the file analyzing unit 220. With the graphical user interface, the user may carry out editing on an addition, a removal, an arrangement and a connection of each module. The configuration editing unit 250 may also generate the interconnection diagram based on the arrangement and connections of the respective modules defined by the user through the graphical user interface. Further, the configuration editing unit 250 may generate a data model 240 which is a set of data objects configuring the interconnection diagram.

The configuration file generation unit 230 applies the user input made through the graphical user interface that is provided by the configuration editing unit 250, to generate and output a configuration file 21.

Using the graphical user interface provided by the configuration editing unit 230, the user may i) define the locations of the modules used in an actual embodied DAS, cable connections between the modules, and sectors to which the modules provide services, ii) determine an intensity of input signal into a front end module in the headend unit, and iii) adjust a power ratio of a plurality of base station input signals that use the adjacent frequency bands. Further, the user may iv) determine a configuration of a rack and a sub-rack that are not provided by the propagation environment design tool, and a location of a slot into which the module is inserted in the sub-rack.

Meanwhile, the configuration tool may be implemented by an independent computing unit or a main controller of a headend unit of the DAS. An exemplary computer system for embodying the configuration tool may include a memory, a processing circuit and a user interface. The memory may include a data model used by the configuration tool, and volatile and nonvolatile memory for storing program codes that are used to implement the functions of the configuration tool. The processing circuit may include at least one of a processor, hardware, firmware and the combination thereof. The processing circuit executes the program codes stored in the memory to implement the functions of the configuration tool. The user interface enables the user to interact with the computer system to generate the configuration file. The user interface in some embodiments includes at least one user input unit (for example, a mouse, keyboard, touch screen, and the like) and a display device.

Hereinafter, referring to FIGS. 3A to 3C, some operational methods of the configuration tool will be described.

Figure 3A:
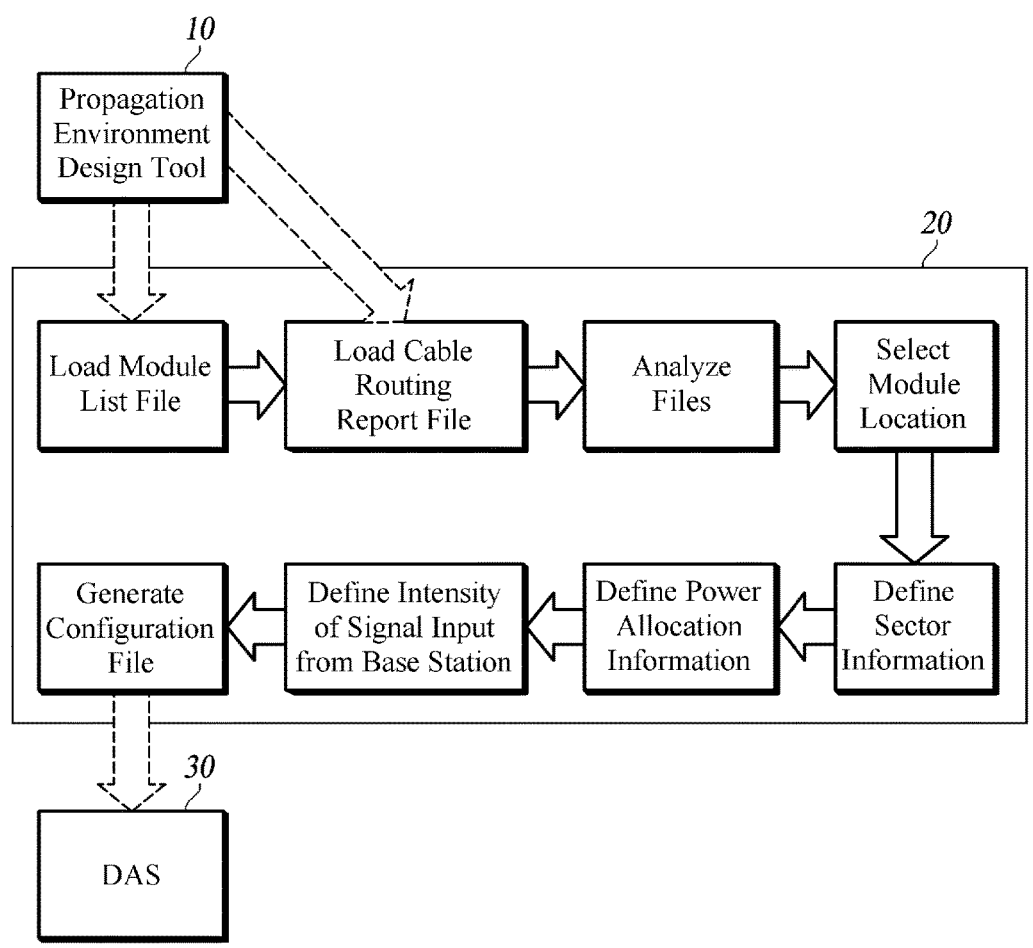
FIG. 3A is a schematic diagram of an operation of a configuration tool according to an embodiment of the present disclosure.

FIG. 3A is a schematic diagram of an operation of a configuration tool according to some embodiments of the present disclosure. In the present embodiment, the configuration tool is configured to generate a configuration file by using an output from the propagation environment design tool.

The configuration tool analyzes specific outputs of the propagation environment design tool to collect information on a list of modules to be installed and cable connections between the modules. The user may additionally input Information that is not provided by the output of the propagation environment design tool. The configuration tool determines a proper installation location of the module based on the information on the list of the modules to be installed and the cable connections between the modules. The user may change an installation location of the module suggested by the configuration tool.

When the installation location of the module is finalized, the user may input information on a sector of each module and information on an intensity of the signal received from the base station. In addition, when signals of several base stations use the adjacent frequency bands, the user may determine a ratio of output intensities of modules that receive the signals of the base stations.

Finally, the configuration tool generates and outputs a configuration file that the DAS can use.

Figure 3B:
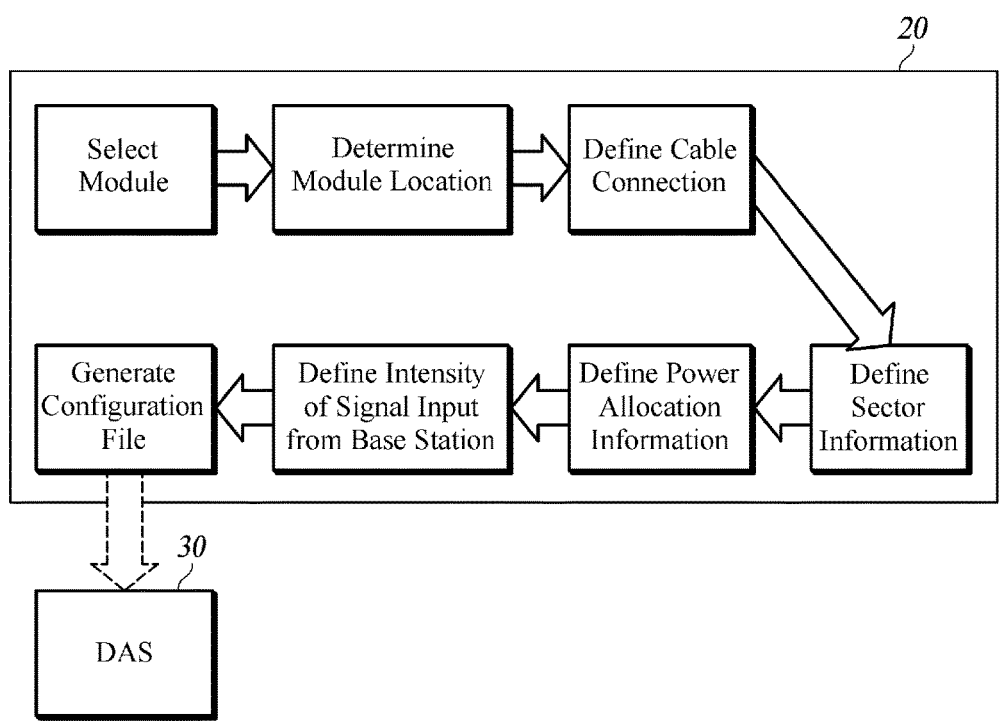
FIG. 3B is a schematic diagram of an operation of a configuration tool according to another embodiment of the present disclosure.

FIG. 3B is a schematic diagram of an operation of a configuration tool according to another embodiment of the present disclosure. In this embodiment, the configuration tool is adapted to generate a configuration file, without using an output provided from the propagation environment design tool. The configuration tool provides a graphical user interface to enable a user to prepare a list of modules, determine installation locations of the modules and determine a cable connections between the modules. When the installation locations of the modules are finalized, there is provided a graphical user interface that allows to adjust a sector allocation, and the input signal intensities and the ratio, which is similar to those of FIG. 3A. Finally, a new configuration file is generated and outputted.

Figure 3C:
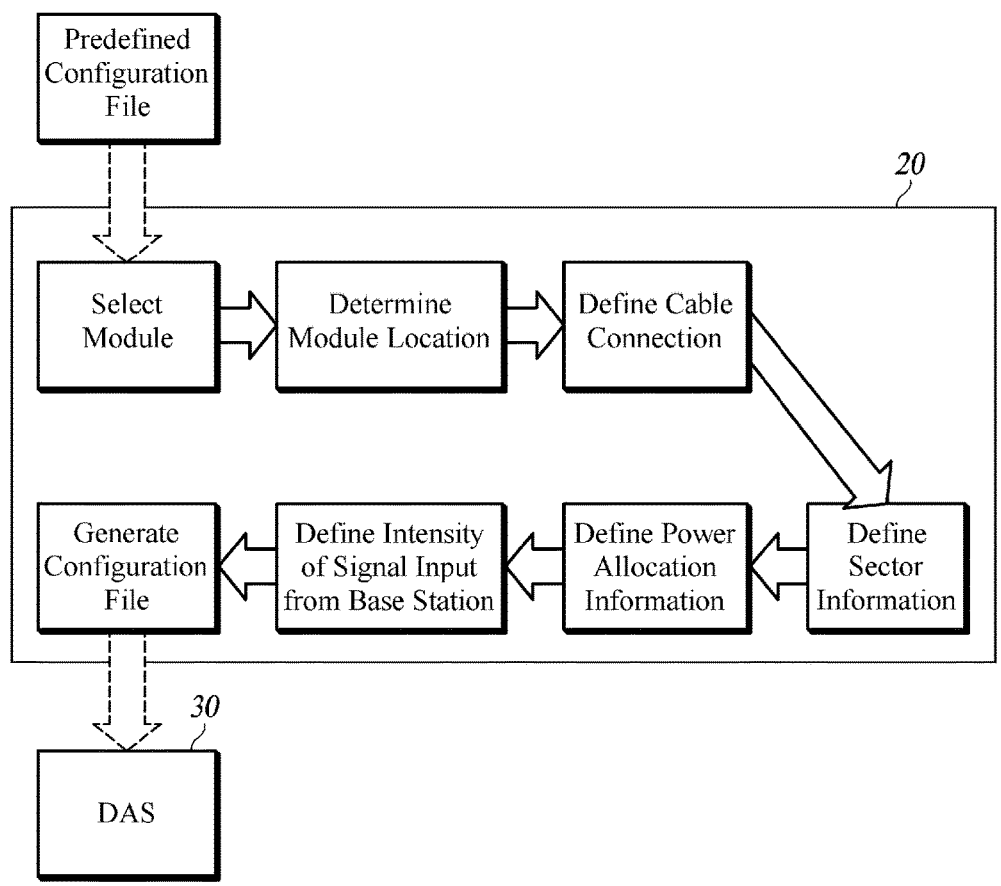
FIG. 3C is a schematic diagram of the functional blocks of a configuration tool according to yet another embodiment of the present disclosure.

FIG. 3C is a schematic diagram of the functional blocks of a configuration tool according to yet another embodiment of the present disclosure. Here, the configuration tool fetches the configuration file that has been generated once, performs an information loading, and generates a configuration file again. As illustrated in FIG. 3C, when a past configuration file is loaded, the configuration tool analyzes the configuration file, enables the user to select a module to be added or deleted, and provides a graphical user interface for adjusting a module installation location, a cable connection, a sector allocation, and the input signal intensities and the ratio depending on the changes. Finally, a new configuration file is generated and outputted.

Figure 4:
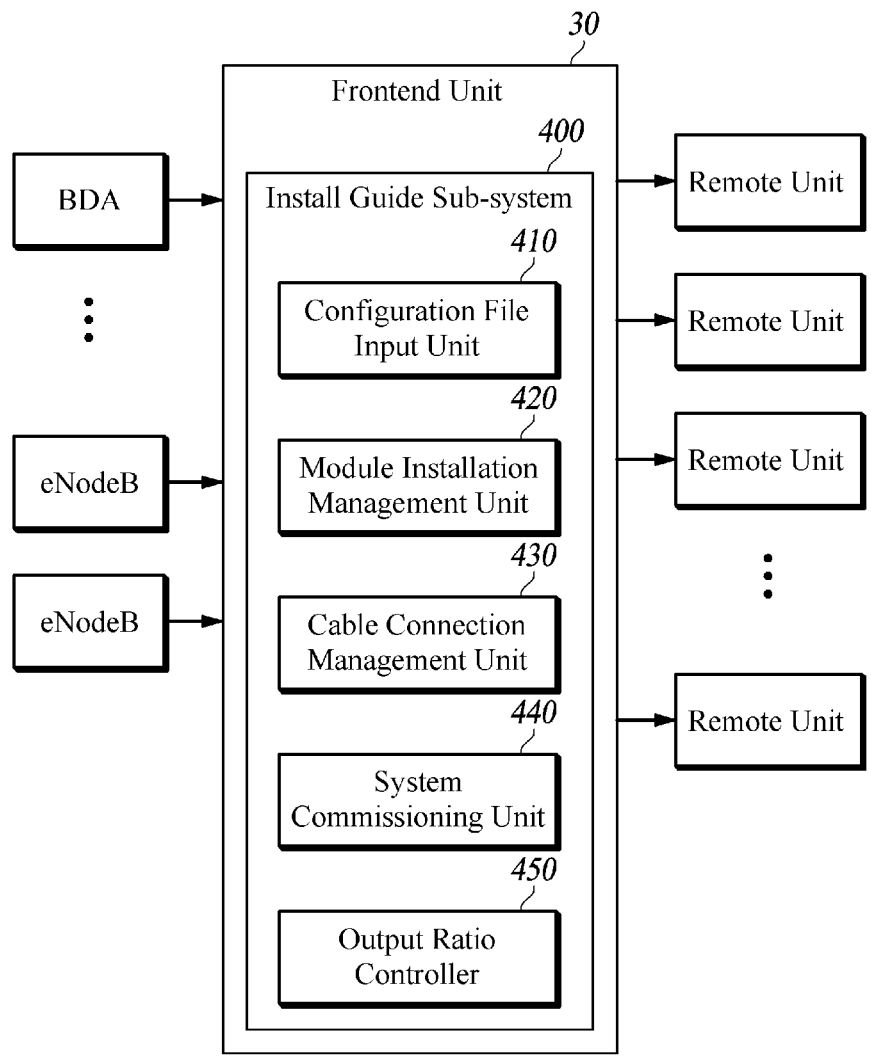
FIG. 4 is a schematic diagram of a headend unit of a distributed antenna system according to an embodiment of the present disclosure.

FIG. 4 is a schematic diagram of a headend unit of a distributed antenna system according to some embodiments of the present disclosure.

As illustrated in FIG. 4, a frontend unit 30 of the distributed antenna system may include an installation guide subsystem 400 that implements an installation guide function by using a configuration file generated by a configuration tool. The subsystem includes an installation file input unit 410, a module installation management unit 420, a cable connection management unit 430, a system commissioning unit 440 and an output ratio controller 450.

The configuration file input unit 410 loads a configuration file generated by the configuration tool.

The module installation management unit 420 displays the respective module types and locations suggested by the configuration file, and identifies whether the presented module is the same as the modules installed on the headend unit. That is, the module installation management unit 420 serves to analyze the inputted configuration file, make a graphics-based presentation of the types and locations of the modules to be installed, and identify whether the presented module is the same as an actually installed module. The module installation management unit 420 checks an install location and a module name for a possible problem, and if there is one, the module installation management unit 420 provides the user with relevant information.

The cable connection management unit 430 guides cable connections between modules installed on the headend unit. For example, the cable connection management unit 430 may graphically display relevant modules and locations to be connected or control the operation of an LED located near the connector of an actual module, in order that the user can visually recognize them with ease.

Based on an intensity of signal inputted from the base station prescribed in the configuration file, the system commissioning unit 440 adjusts gains of the respective modules into an optimized condition to provide services. For example, it implements a system optimization depending on external input conditions such as a loss compensation depending on the distance of optical fiber cable, a loss compensation depending on a cable connection and an optimization requirement depending on an intensity of signals inputted from the base station.

The output ratio controller 450 adjusts a ratio of output intensities of modules that receive base station signals that utilize the adjacent frequency bands.

Figure 5:
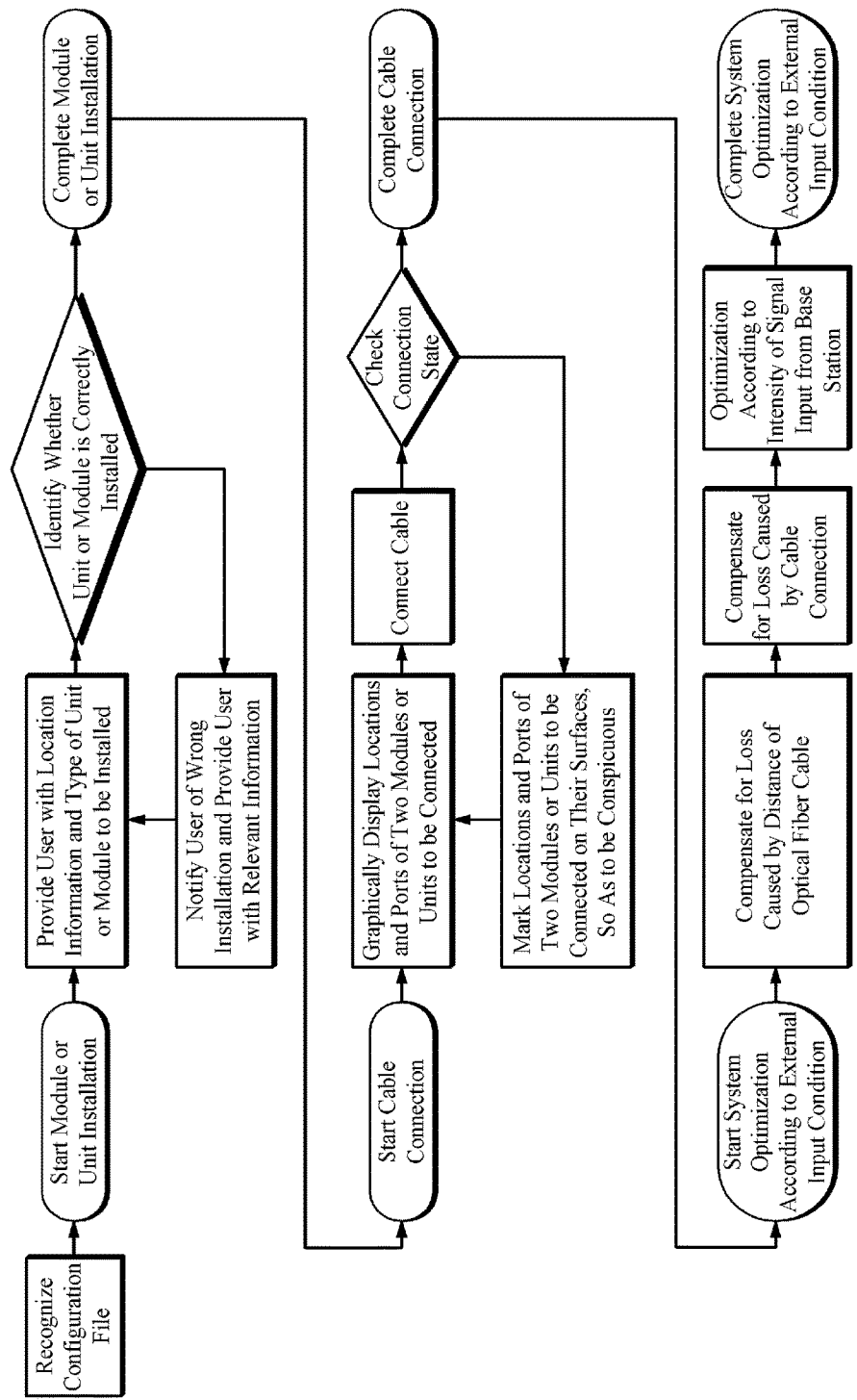
FIG. 5 is a flowchart illustrating an automatic configuration process using a configuration file in a distributed antenna system according to an embodiment of the present disclosure.

FIG. 5 is a flowchart illustrating an automatic configuration process using a configuration file in a distributed antenna system according to some embodiments of the present disclosure.

The distributed antenna system receives a configuration file generated by a configuration tool, and provides an installation guide function to implement configuration works such as setting the types and locations of modules, cable connections between the modules and a system optimization, which are suggested by the configuration file.

First, the distributed antenna system provides graphics-based information on the types and locations of the modules to be installed, based on the configuration file. When the modules are installed by the user, the types and locations of the installed module are identified, to provide the user with information on improperly installed modules.

When all the modules are completely installed, a cable connection process starts. The distributed antenna system provides graphics-based information on the locations and ports of the modules to be connected, based on the configuration file. Also, in order that the user easily recognizes connector locations of two modules to be connected, the system may control the operational states of an LED (for example, a color change, a flickering or the like) installed on each module. Additionally, the distributed antenna system automatically senses a cable connection when it is connected, to provide the user with information on whether or not an abnormality exists.

When the cable connection is completed, a system optimization is implemented according to external input conditions such as a loss compensation depending on the distance of an optical fiber cable, a loss compensation depending on the cable connection, an optimization requirement depending on an intensity of the signal inputted from the base station, and an output ratio adjustment between the base station signals having the same band.

Upon completion of the output adjustment of the respective modules, the service launches through a remote unit of the distributed antenna system.

With the installation guide function of the distributed antenna system according to some embodiments of the present disclosure, the user may implement the installation of a plurality of modules and cable connections between modules with ease. The user is able to implement the installation work without errors thanks to the capability of the distributed antenna system for detecting an error occurred when installing the modules or connecting the cable and providing the user with the relevant information.

In addition, the distributed antenna system automatically controls the gain of each module based on the intensity of a signal inputted from the base station prescribed in the configuration file, whereby an optimized system may be easily configured according to an external input condition tool according to some embodiments of the present disclosure, a shape of the distributed antenna system may be easily generated by using an output of the propagation environment design tool or by allowing the very user to define the modules, the cable connections and the like for incorporation into a design model.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the claimed invention is not to be limited by the above explicitly described embodiments but by the claims and equivalents thereof.

What is claimed is:

1. A method, performed by a headend unit of a distributed antenna system, for providing an installation guide, the method comprising:
   receiving a configuration file generated from a design model of the distributed antenna system, the configuration file including information on types and attributes of objects included in the design model;
   providing a graphical user interface for guiding types and locations of modules to be installed in the headend unit, correspondingly to defined types and locations of objects defined in the configuration file;
   providing a graphical user interface for guiding cable connections between the modules installed in the headend unit, correspondingly to defined cable connections between the objects defined in the configuration file;
   receiving, from a user, signal intensities inputted from base stations whose information on signal intensities are not defined in the configuration file; and controlling gains of the modules installed in the headend unit, based on inputted signal intensities; and
   controlling gains of the modules installed in the headend unit, based on the inputted signal intensities received from the user and signal intensities inputted from base stations defined in the configuration file.

2. The method of claim 1, further comprising:
   determining whether the modules installed in the headend unit match defined information in the configuration file; and
   providing, in response to a determination of a mismatch between the modules and the defined information, information on a mismatched module.

3. The method of claim 1, further comprising:
   determining whether the defined cable connections between the objects in the configuration file matched the cable connections between the modules installed in the headend unit; and
   providing, in response to a determination of a mismatch between the defined cable connections and the cable connections, information on a mismatched module connection.

4. The method of claim 1, further comprising:
   controlling at least one LED (light emitting diode) provided in the modules to be interconnected by using a cable, so as to enable a user to visually recognize the modules to be interconnected.

5. A headend unit of a distributed antenna system, the headend unit comprising:
   a configuration file input unit configured to receive a configuration file generated from a design model of the distributed antenna system, the configuration file including information on objects included in the design model and attributes of the objects;
   an installation management unit configured to provide a graphical user interface for guiding types and locations of modules to be installed in the headend unit, correspondingly to defined types and locations of the objects defined in the configuration file; and
   a cable connection management unit configured to provide a graphical user interface for guiding cable connections between the modules installed in the headend unit, correspondingly to defined cable connections between the objects defined in the configuration file; and
   an output ratio controller configured to control a ratio of signal intensities of base station signals using adjacent frequency hands, depending on inputted ratio of sign l intensities between base station signals received from a user that are not defined in the configuration file and a defined ratio of signal intensities between base station signals defined in the configuration file.

6. The headend unit of claim 5, further comprising:
   a system commissioning unit configured to control gains of the modules installed in the headend unit, depending on intensities of the signals inputted from base stations defined in the configuration file.

7. A method, performed by a headend unit of a distributed antenna system, for providing an installation guide, the method comprising:
   receiving a configuration file generated from a design model of the distributed antenna system, the configuration file including information on types and attributes of objects included in the design model;
   providing a graphical user interface for guiding types and locations of modules to be installed in the headend unit, correspondingly to defined types and locations of objects defined in the configuration file;
   providing a graphical user interface for guiding cable connections between the modules installed in the headend unit, correspondingly to defined cable connections between the objects defined in the configuration file;
   receiving from a user, an inputted ratio of signal intensities of base station signals using adjacent frequency bands that are not defined in the configuration file; and
   controlling intensities of the base station signals using adjacent frequency bands, based on the inputted ratio of the signal intensities received from the user and a defined ratio of signal intensities between base station signals defined in the configuration file.

\* \* \* \* \*